United States Patent
Park

(10) Patent No.: US 7,173,181 B2
(45) Date of Patent: Feb. 6, 2007

(54) COUPLING SET FOR CONNECTING GROUND PLATE FOR ARREST OF LIGHTNING

(76) Inventor: Joon-Young Park, 258-2, Geoyeo 2-dong, Songpa-gu, Seoul 138-815 (KR)

( * ) Notice: Subject to any disclaimer, the term of this patent is extended or adjusted under 35 U.S.C. 154(b) by 0 days.

(21) Appl. No.: 10/533,556

(22) PCT Filed: Nov. 7, 2003

(86) PCT No.: PCT/KR03/02376

§ 371 (c)(1),
(2), (4) Date: May 2, 2005

(87) PCT Pub. No.: WO2004/042873

PCT Pub. Date: May 21, 2004

(65) Prior Publication Data

US 2006/0012938 A1    Jan. 19, 2006

(30) Foreign Application Priority Data

Nov. 8, 2002    (KR) ...................... 20-2002-0033403

(51) Int. Cl.
*H01B 13/00* (2006.01)

(52) U.S. Cl. .................... 174/5 R; 174/5 SG; 174/6

(58) Field of Classification Search ................ 174/135, 174/5, 5 SG, 6, 5 R; 361/220
See application file for complete search history.

(56) References Cited

FOREIGN PATENT DOCUMENTS

| KR | 0185354 | 3/2000 |
|---|---|---|
| KR | 0265496 | 2/2002 |
| KR | 0267212 | 3/2002 |
| KR | 0272239 | 4/2002 |
| KR | 1020030047909 A | 6/2003 |
| KR | 1020030052460 A | 6/2003 |

*Primary Examiner*—Jinhee Lee
(74) *Attorney, Agent, or Firm*—John W. Renner; Renner, Otto, Boisselle & Sklar

(57) ABSTRACT

A coupling set for connecting a ground plate for arrest of lightning is provided, in which the ground plate is embedded underground below an electric pole in order to effectively arrest lightning. Accordingly, lightning can be effectively grounded. The connection members are connected with each other top and bottom and left and right. The lowest connection member is supported below an electric pole. Thus, when the electric pole is buried, a coupling set having connection members for connecting a ground plate is not be pushed up. Also, it is very easy to connect a lightning arrest copper wire with a ground terminal.

2 Claims, 4 Drawing Sheets

COUPLING SET FOR CONNECTING GROUND PLATE FOR ARREST OF LIGHTNING

TECHNICAL FIELD

The present invention relates to a coupling set for connection of a lightning arrest ground plate, and more particularly, to a coupling set for connecting a ground plate for arrest of lightning, in which the ground plate is embedded underground below an electric pole in order to effectively arrest lightning.

BACKGROUND ART

The Inventor has improved his previous registered Korean Utility Model entitled "a coupling set for connection of a lightning arrest ground plate" disclosed in Korean Utility Model Publication No. 20-2002-282258 on 19 Jul. 2002. In the Korean Utility Model Publication No. 20-2002-282258, a coupling set for connection of a lightning arrest ground plate is embedded and buried below a burial place of an electric pole. Here, the coupling set for connection of the ground plate is not fixed at a fixed position but pushed and raised along the electric pole. Also, separate clips are needed to combine lightning arrest copper wires with ground terminals.

DISCLOSURE OF THE INVENTION

To solve the above problems, it is an object of the present invention to provide a coupling set for connecting a ground plate for arrest of lightning in which when the electric pole is buried, a coupling set having connection members for connecting a ground plate is not be pushed up, and it is also very easy to connect a lightning arrest copper wire with a ground terminal.

To accomplish the above object of the present invention, there is provided a coupling set for connecting a ground plate for arrest of lightning in which a stopper is needed in order that the connection coupling set of the ground plate may not secede from the bottom surface of an electric pole.

Also, when the connection coupling sets of the ground plate are connected with one another in the lengthy direction, and the lowest ground plate connection coupling set is fixed, the other ground plate connection coupling sets are fixed in series. Further, since ground terminals are also configured into a clip or tightener shape of a simple shape, ground copper wires can be easily combined with the ground terminals without having a fixing clip on a working site.

BRIEF DESCRIPTION OF THE DRAWINGS

The above and other objects and advantages of the present invention will become more apparent by describing the preferred embodiment thereof in more detail with reference to the accompanying drawings in which.

BEST MODE FOR CARRYING OUT THE INVENTION

A coupling set for coupling a ground plate for arrest of lightning according to a preferred embodiment of the present invention will be described with reference to the accompanying drawings.

Figure 1:
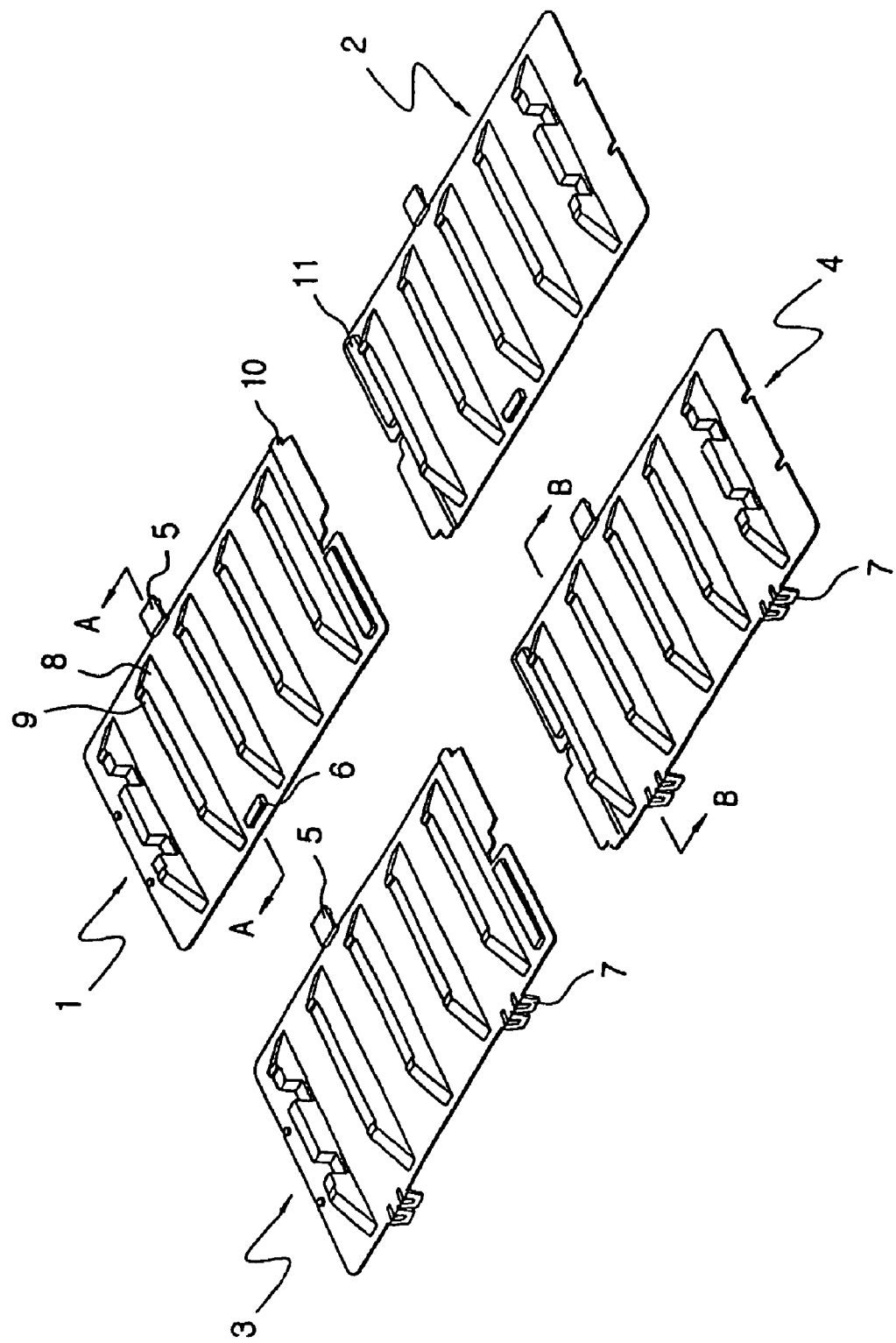
FIG. 1 is a perspective view of each connection member according to the present invention.
Figure 2:
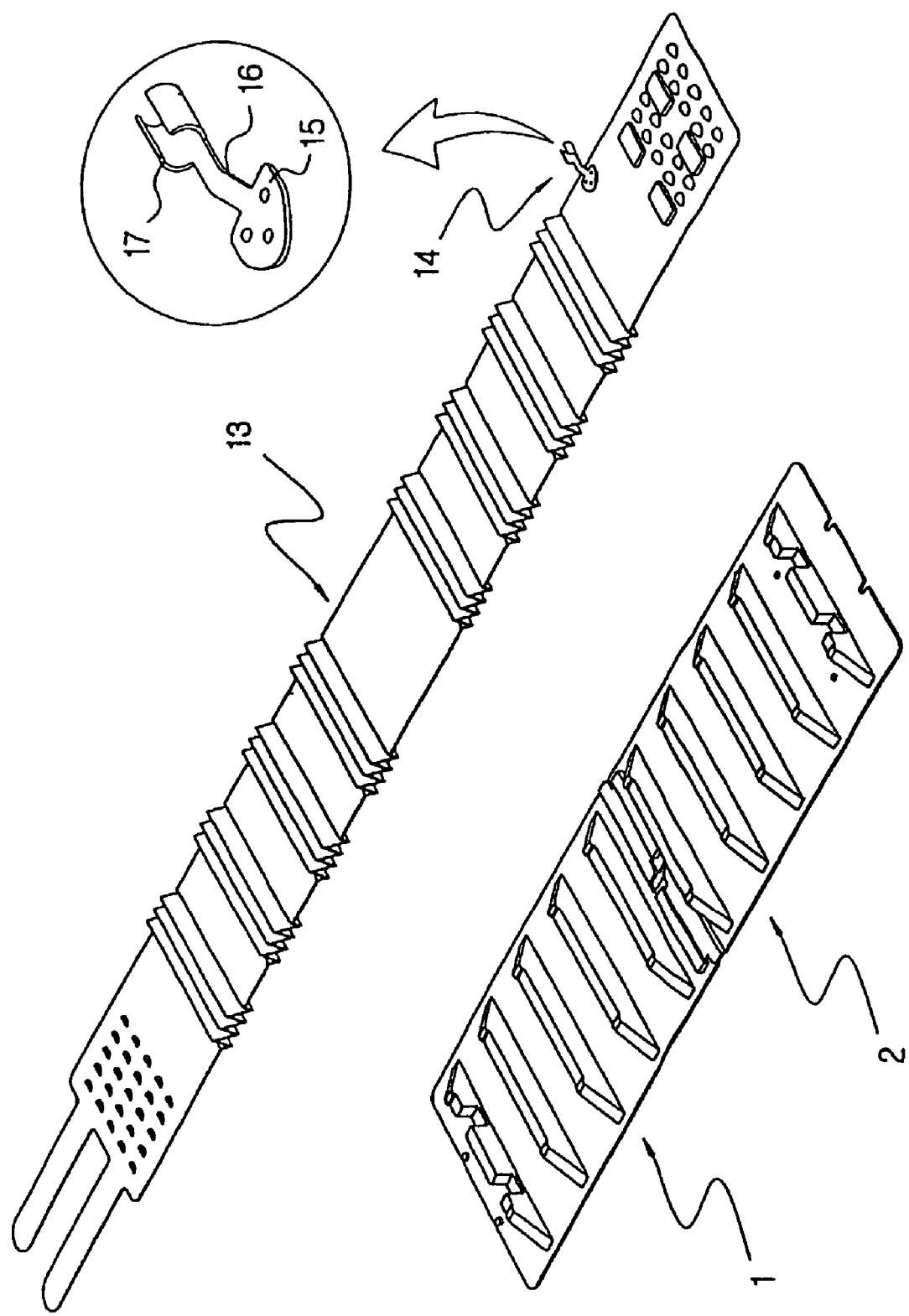
FIG. 2 is a perspective view for explaining a relationship of connection between connection embers and a ground copper plate according to the present invention.
Figure 4:
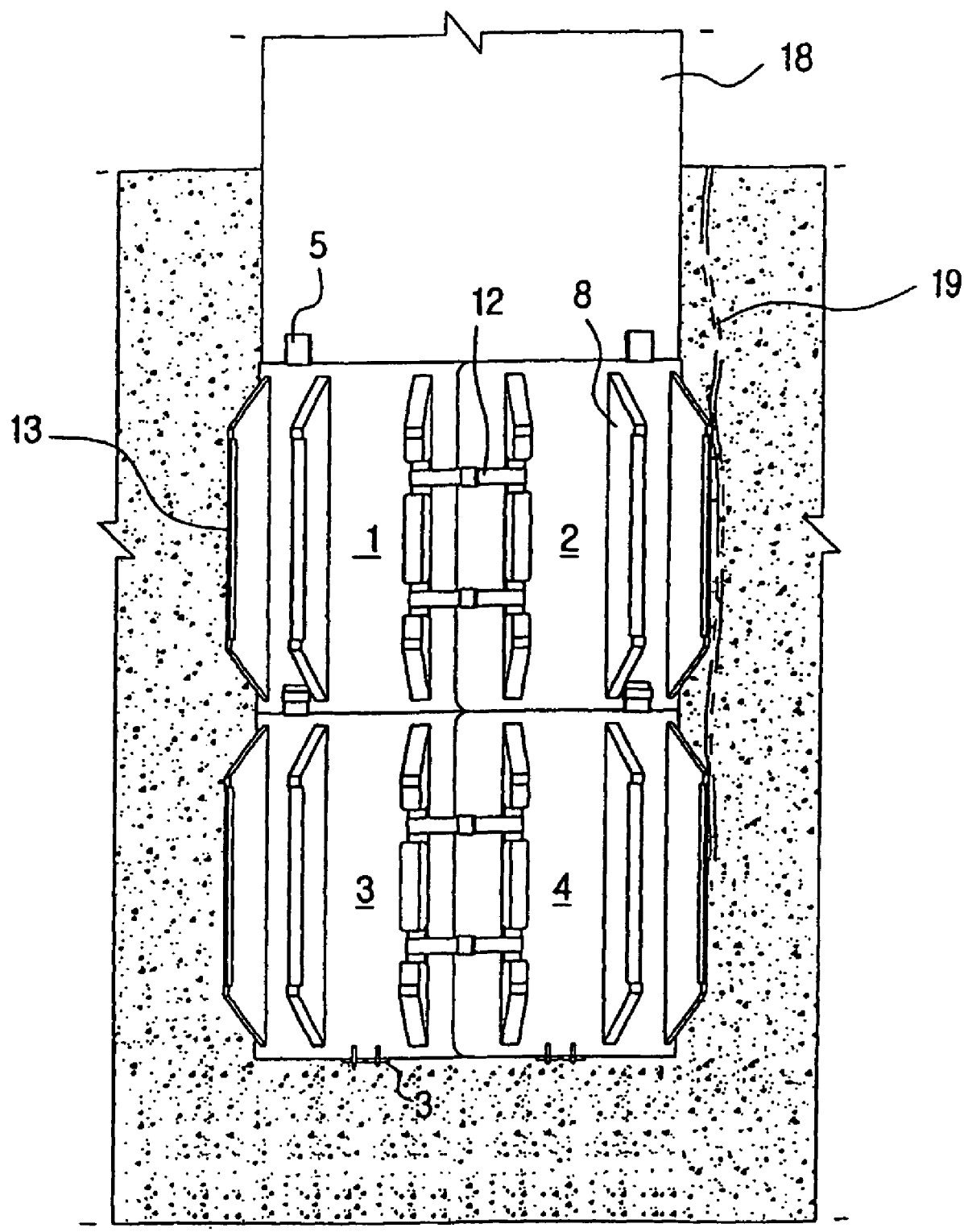
FIG. 4 shows a state where a ground plate has been installed below an electric pole according to the present invention.

Referring to FIGS. 1 and 4, a coupling set for connecting a ground plate for arrest of lightning according to the present invention has a structure where a first connection member 1 and a second connection member 2 which are connected horizontally with each other are positioned at the upper portion of the whole coupling set, and a third connection member 3 and a fourth connection member 4 which are connected horizontally with each other are positioned at the lower portion thereof. Then, the first connection member 1 and the second connection member 2 are connected vertically with the third connection member 3 and the fourth connection member 4, respectively. As shown in FIG. 4, the first connection member 1 and the second connection member 2 are connected with each other by means of tightening belts 12 in a burial portion of an electric pole 18, and likewise the third connection member 3 and the fourth connection member 4 are connected with each other by means of tightening belts 12 in the burial portion of the electric pole 18. A ground copper plate 13 of FIG. 2 is mounted on mount seats 9 of spacers 8 formed on the respective connection members 1 to 4, so that the ground copper plate 13 is connected on the connection members by left-hand and right-hand coupling portions shown.

Figure 3:
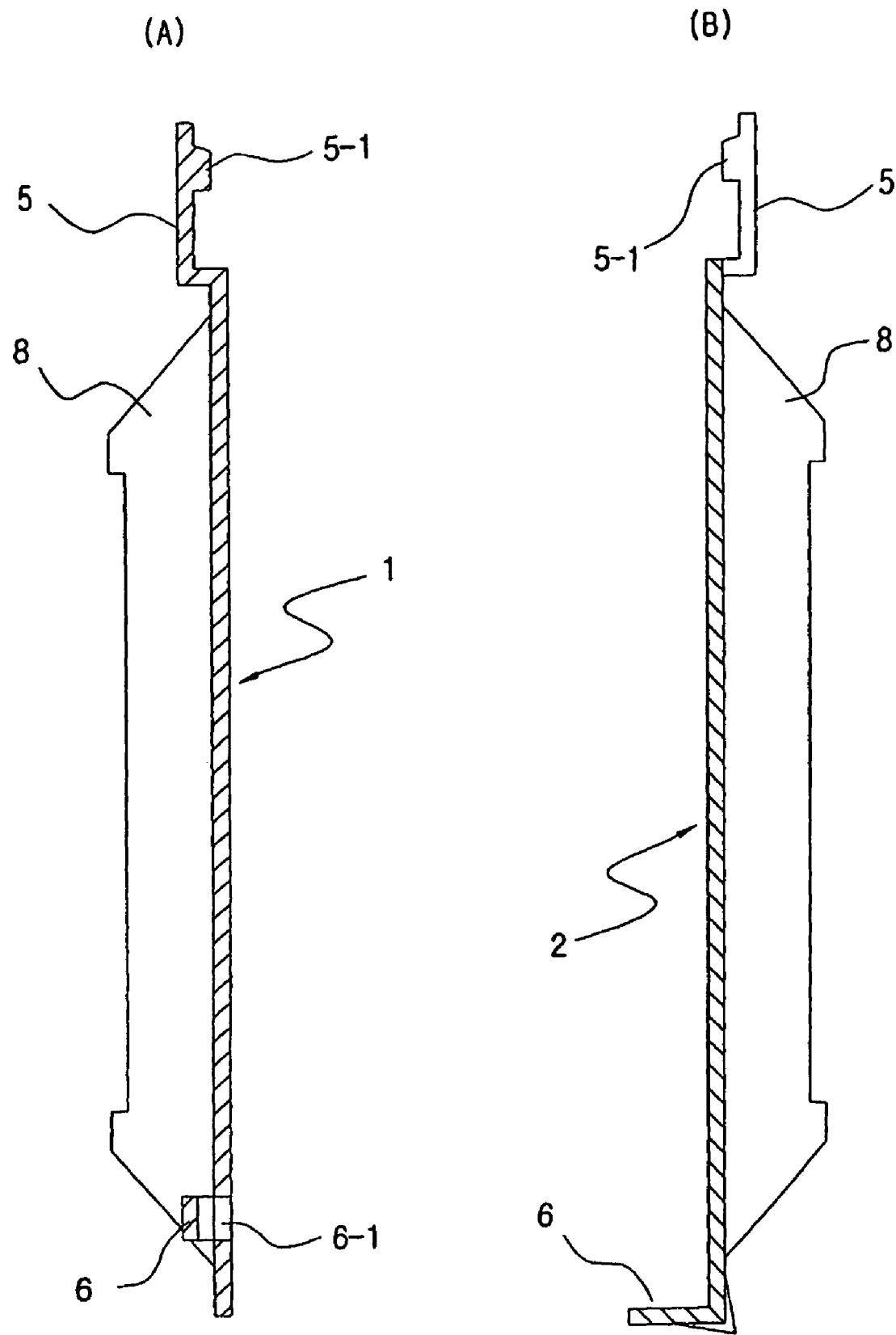
FIG. 3A is a cross-sectional view cut along a line A—A of FIG. 1.
FIG. 3B is a cross-sectional view cut along a line B—B of FIG. 1.

Referring to FIGS. 3A and 3B in the present invention, an upper connection piece 5 having a key protrusion 5-1 is formed on the upper portion of first and second connection members 1 and 2, respectively, and an upper connection groove 6 having a key groove 6-1 is formed on the respective lower portions thereof. An upper connection piece 5 having a key protrusion 5-1 is formed on the upper portion of third and fourth connection members 3 and 4, respectively, and at least one lower supporter 7 is formed in the respective lower portions thereof. A ground copper plate 13 combined with a ground terminal 14 is mounted on mount seats 9 of the connection members 1 to 4, so that the ground copper plate 13 is horizontally mounted.

The ground terminal 14 includes a lower fixing portion 15, a middle bent portion 16, and an upper combiner 17 whose ends are open. In the present invention, the connection members 1 and 2 are horizontally connected with each other, and the connection members 3 and 4 are horizontally connected with each other, and then the connection member 1 and the connection member 2 are connected vertically with the connection member 3 and the connection member 4, respectively, in which the upper connection piece 5 is combined with the upper connection groove 6. Then, the connection members 1 to 4 which have been connected to each other are combined with the lower portion of an electric pole 18 by means of tightening belts 12, and then the ground copper plate 13 is horizontally wound around and combined with the connection members. Thereafter, lightening arrest copper wires are connected with the ground terminal 14, to thereby complete preparation of burial of the coupling device for connection of a ground plate to arrest lightening, together with the electric pole 18. Here, lower supporters 7 formed in the lower portions of the respective third and fourth connection members 3 and 4 and bent inwards therefrom are supported on the bottom surface of the electric pole 18 and thus prevent the connection members from being pushed up and raised. The first and second connection members 1 and 2 can be combined in a multiple layer as many as the number desired by a designer. Here, couplers for connecting the first and second connection members 1 and 2 are upper connection pieces 5 and upper connection grooves 6. The upper connection pieces 5 and upper connection grooves 6 are connected in a female-to-male fashion, and vertically. Meanwhile, the ground terminal 14 is a simple linear-shaped terminal, but has an upper combiner 17 whose ends are open such as a clip or joint terminal. Accordingly, lightening arrest copper wires 19 are fitted into the combiner 17 and then the combiner 17 is tightened by a tightening tool to thereby easily connect the lightening arrest copper wires with the ground plate.

INDUSTRIAL APPLICABILITY

As described above, the present invention provides a coupling set for connecting a ground plate for arrest of lightning in which respective connection members are connected with one another, in all directions such as left, right, up and down. Thus, when the electric pole is buried, a coupling set having connection members for connecting a ground plate is not be pushed up, and it is also very easy to connect a lightning arrest copper wire with a ground terminal.

As described above, the present invention has been described with respect to a particularly preferred embodiment. However, the present invention is not limited to the above embodiment, and it is possible for one who has an ordinary skill in the art to make various modifications and variations, without departing off the spirit of the present invention.

What is claimed is:

1. A coupling set for connecting a ground plate for arrest of lightning, the coupling set comprising:

a first group of connection members (1 and 2) having an upper connection piece (5) having a key protrusion (5-1) formed on the upper portion thereof, respectively, and a lower connection groove (6) having a key groove (6-1) formed on the respective lower portions thereof; and a second group of connection members (3 and 4) below said first group forming vertically spaced first and second groups and having an upper connection piece (5) having a key protrusion (5-1) formed on the upper portion thereof configured to fit in said lower connection groove (6), respectively, and at least one lower supporter (7) formed in the respective lower portions thereof, said vertically spaced first and second groups and each having mount seats, and ground copper plates (13) each with a ground terminal (14) mounted on said mount seats (9) of the connection members (1-4).

2. The coupling set for connecting a ground plate for arrest of lightning of claim 1, wherein each ground terminal (14) comprises a lower fixing plate (15), a middle bent portion (16), and an upper connector (17) whose terminating portions are open.

* * * * *